(No Model.)
A. C. McMICKEN.
COMBINED DISCOUNT MEASURING GLASS AND BANK NOTE EXAMINER.
No. 373,597. Patented Nov. 22, 1887.
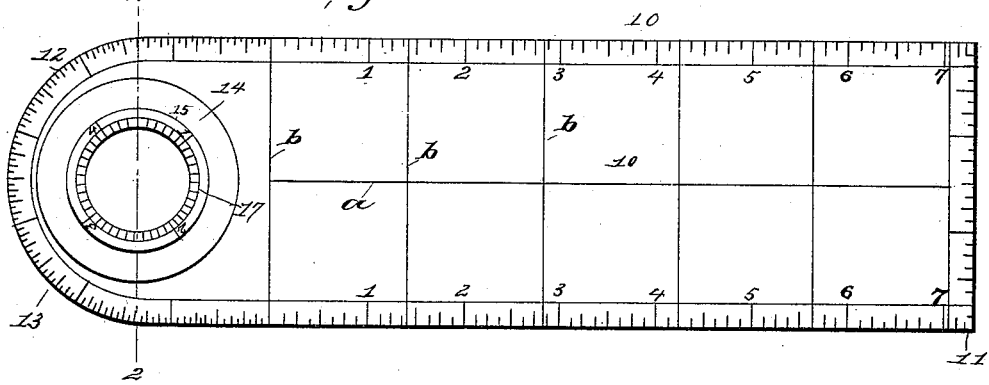
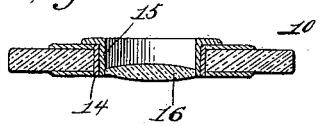
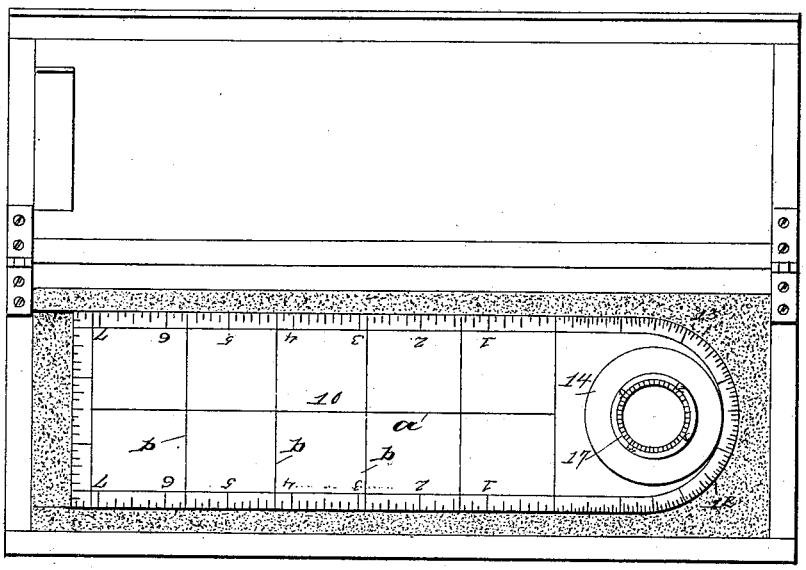
WITNESSES:
W. R. Davis
C. Sedgwick
INVENTOR:
A. C. McMicken
BY Munn & Co.
ATTORNEYS.

UNITED STATES PATENT OFFICE.

ALBERT CLIFTON McMICKEN, OF WINNIPEG, MANITOBA, CANADA.

COMBINED DISCOUNT-MEASURING GLASS AND BANK-NOTE EXAMINER.

SPECIFICATION forming part of Letters Patent No. 373,597, dated November 22, 1887.

Application filed July 6, 1887. Serial No. 243,498. (No model.)

*To all whom it may concern:*

Be it known that I, ALBERT CLIFTON MC-MICKEN, of Winnipeg, in the Province of Manitoba and Dominion of Canada, have invented a new and Improved Combined Discount-Measuring Glass and Bank-Note Examiner, of which the following is a full, clear, and exact description.

This invention relates to a combination implement that is applicable for use in examining and in redeeming bank-notes; and it consists, essentially, of an oblong glass of any desirable thickness, square at one end and semicircular at the other, and provided along the edges for the full length of a bank-note with a scale that is marked, etched, or otherwise applied, said scale appearing, preferably, in inches and parts of an inch, and being used for measuring notes and parts of a note, and in ascertaining the exact size and length of signatures and numbering for comparison with the known size of lettering, numbering, and signatures of genuine bills. Along the edge of the semicircular end is also marked or etched a measure or scale adapted to measure parts of circles, vignettes, curves, &c. Just within the semicircle at one end of the glass there is mounted a magnifying-lens of sufficient power to expose the degrees of fineness or coarseness of the fiber of the paper on which the notes are printed, and also to expose any inaccuracies in the vignette, pattern, printing, lathe, and scroll-work. On the rim of the setting containing the magnifying-lens there is also marked a scale or measure for convenience in measuring circular parts of vignettes and parts of bills undergoing examination by the magnifier. Upon the main body of the glass there is marked a rectangular oblong figure which is the exact size of a bank-note, and this figure is subdivided into fifths and tenths, so that the approximate portion lost from a note may be quickly ascertained upon the presentation of the note.

Reference is to be had to the accompanying drawings, forming a part of this specification, in which similar figures of reference indicate corresponding parts in all the views.

Figure 1 is a face view of my combined measure and discount glass. Fig. 2 is a cross-sectional view, taken on line 2 2 of Fig. 1; and Fig. 3 is a view of the device as it appears when in its case.

In the drawings, 10 represents a glass plate the edges of which are graduated to inches, as shown at 11, this graduation extending along the parallel edges and across one end of the glass, which said end is at right angles to the said parallel edges. The other end of the glass is in the form of a circle, 12, which is also graduated, as shown at 13, said graduation being employed for the purpose hereinbefore referred to. Just within the semicircular end the glass 10 is apertured, and in the aperture so formed there is fitted a gasket, 14, which serves as the support for a sleeve, 15, which carries a lens, 16, the upper rim, 17, of the sleeve 15 being graduated as indicated. The rectangular end of the plate 10 is divided by a central longitudinal line, *a*, that is the exact length of the bank note or bill in connection with which the device is to be employed, and this line is divided into five equal lengths by cross-lines *b*, thus dividing that portion of the face of the plate over which the line *a* passes into ten equal portions.

In operation the glass is to be placed upon the note to be examined and the note is to be evenly covered by that portion of the glass that is traversed by the line *a* and divided into tenths, as described. Then by a casual glance the amount missing from the bill can be quickly ascertained. When the glass is to be used to ascertain the length of signatures and the size of lettering and numbering, in order to compare with the size of signatures, letters, and numbers of bills known to be genuine, the glass may be used in much the same manner as the ordinary foot-rule. For very fine measuring the scale 13 is employed, being subdivided to sixteenths instead of to eighths, as is the case with the scale 11. In examining a suspicious bill or note with the lens 16 the glass 10 is grasped and the lens is properly focused.

By rounding one end of the measure I not only obtain a circular measure for the purpose of measuring vignettes and so on, but I guard against liability of breaking the rectangular corners, and at the same time increase the facility with which the glass may be inserted and removed from its case, such a case as I prefer to employ being shown in Fig. 3.

Having thus fully described my invention, I claim as new and desire to secure by Letters Patent—

1. A combined discount-measurer and bank-note examiner consisting of a glass plate having an oblong figure of the exact size of a bank-note marked thereon, the said figure being divided into rectangular spaces, substantially as described.

2. A combined discount-measurer and bank-note examiner consisting of an oblong glass plate square at one end and semicircular at the other and provided with scales along its edges and with an oblong figure of the exact size of a bank-note, the said figure being divided into rectangular spaces, substantially as described.

3. As an improved article of manufacture, a combined discount-measurer and bank-note examiner consisting of a glass plate provided with scales, a lens mounted in one end thereof, and an oblong figure of the exact size of a bank-note, the said figure being divided into rectangular spaces, as set forth.

ALBERT CLIFTON McMICKEN.

Witnesses:
 EDWARD W. H. ARMSTRONG,
 FRED. J. NIXON.